April 10, 1934.     I. B. LASKOWITZ     1,953,963
BALANCED VARIABLE THRUST PROPELLER CONSTRUCTION
Filed May 17, 1930      3 Sheets-Sheet 3
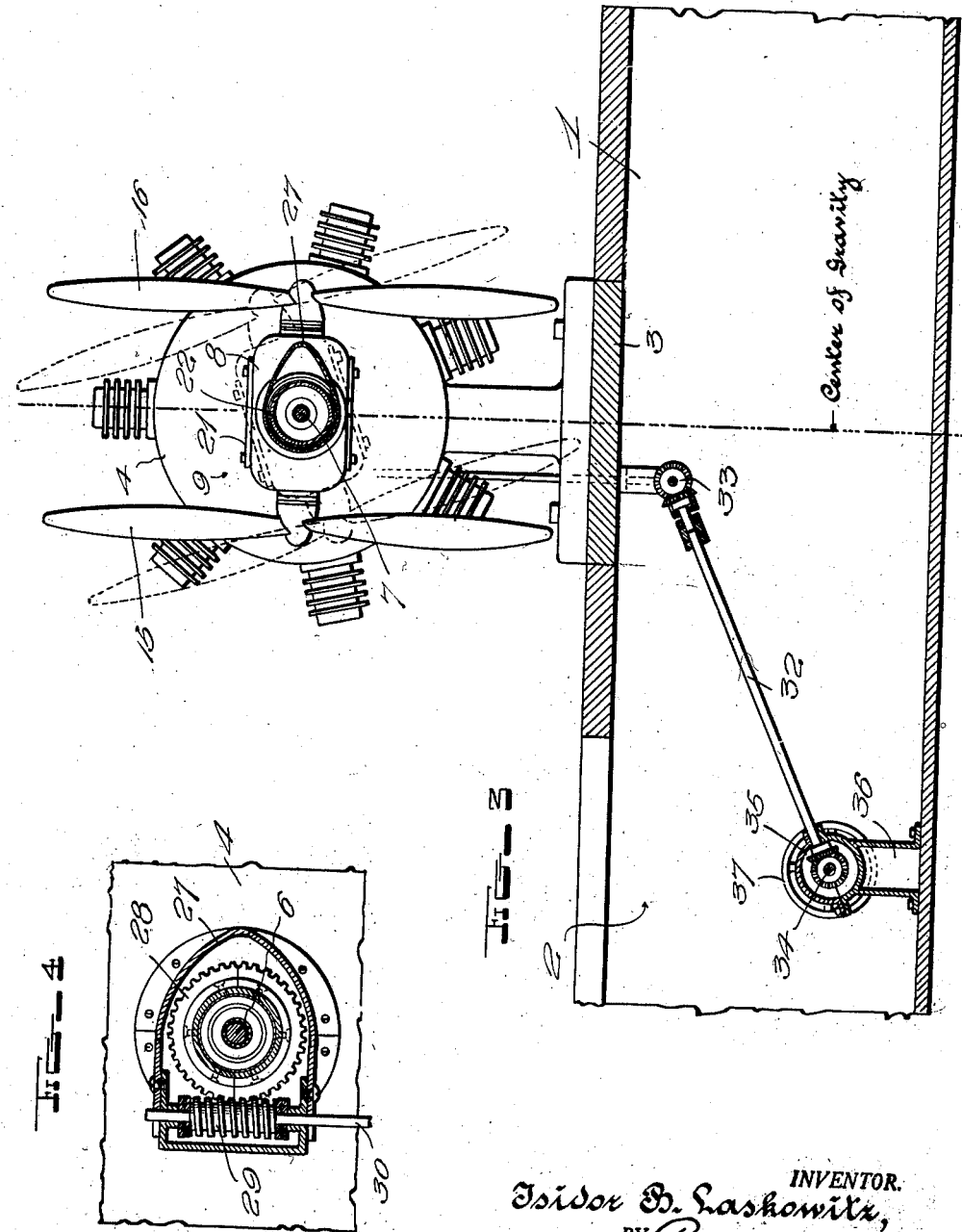
INVENTOR.
Isidor B. Laskowitz,
BY Robert L. Dennison
ATTORNEY Patented Apr. 10, 1934

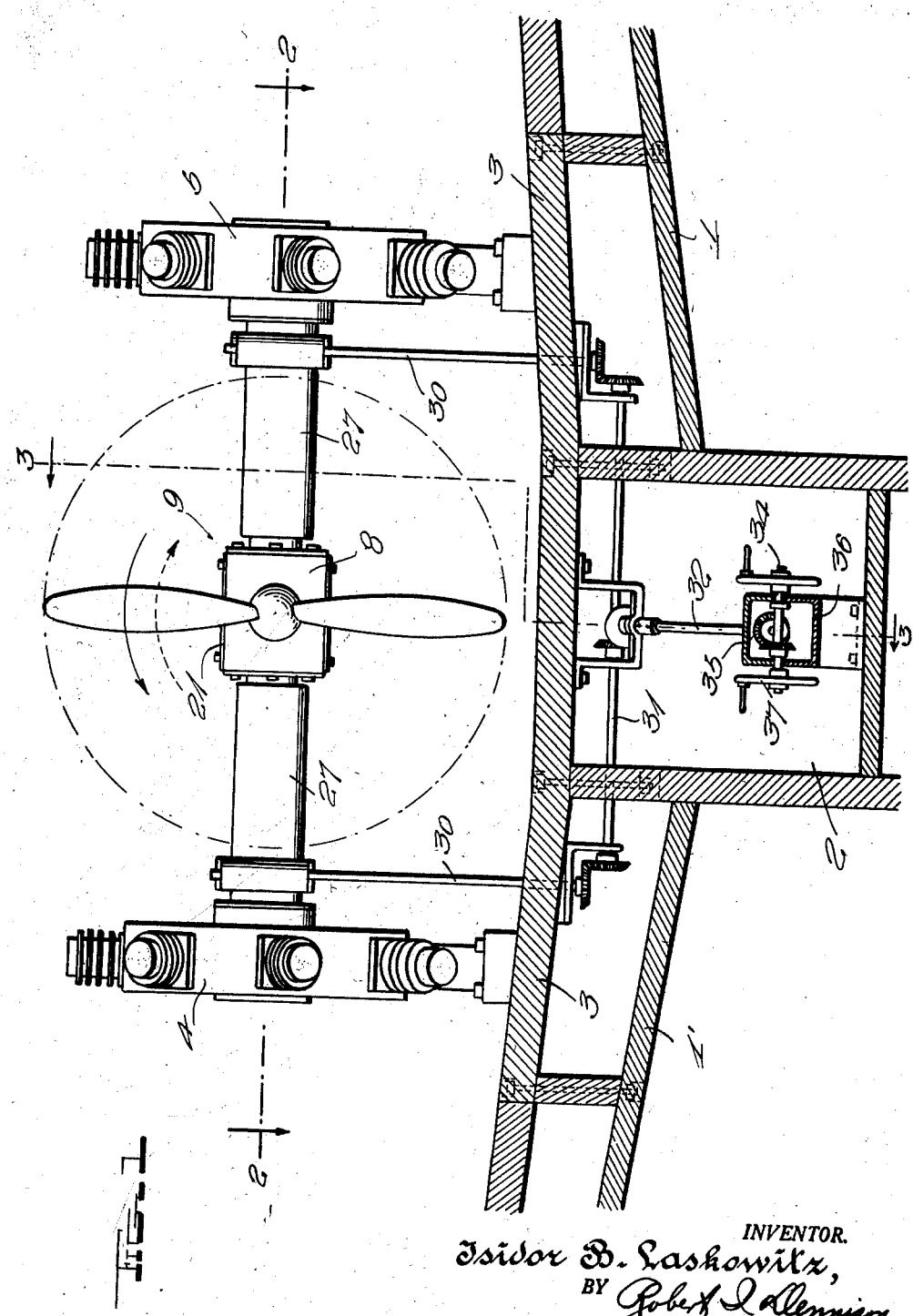

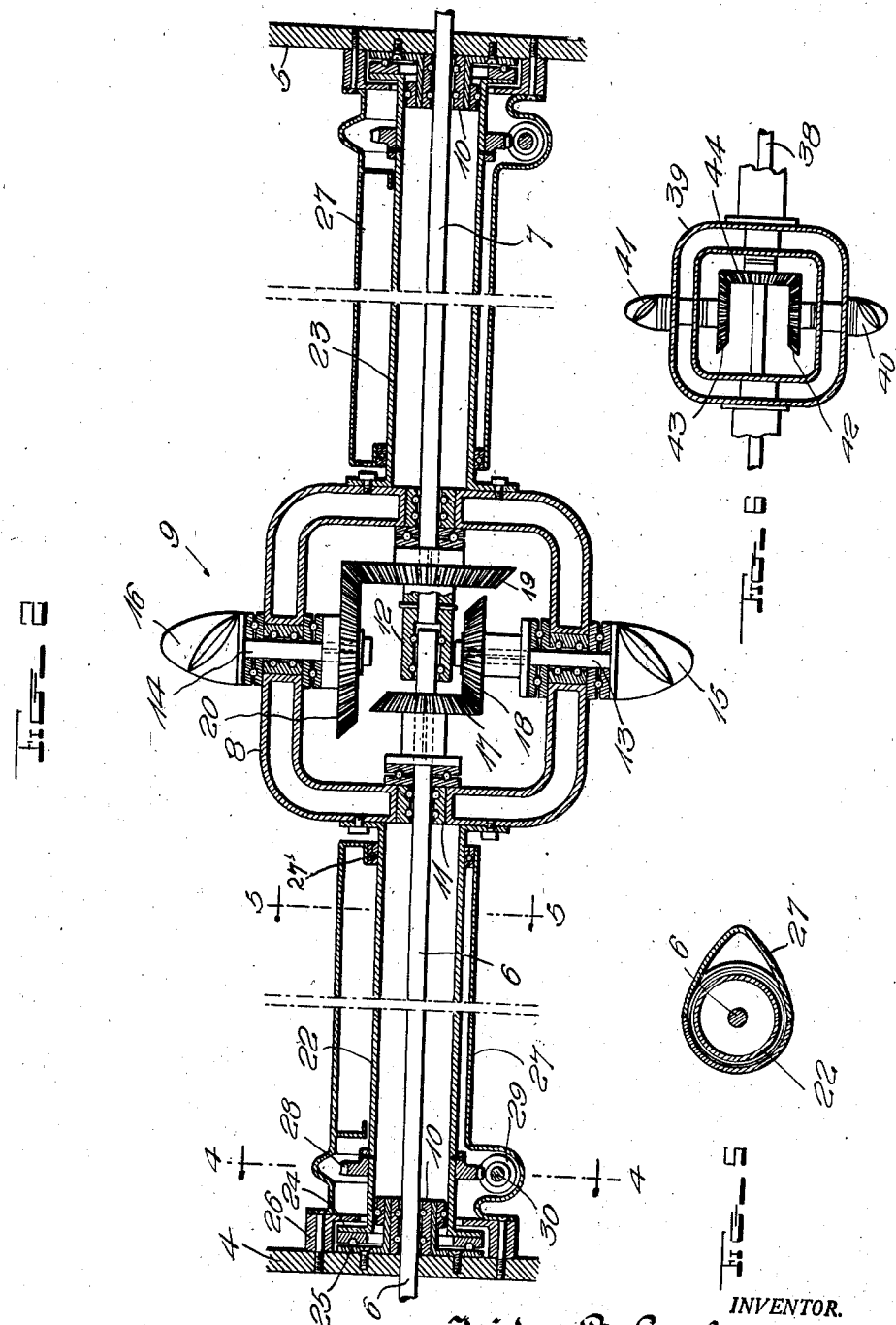

1,953,963

UNITED STATES PATENT OFFICE 1,953,963

BALANCED VARIABLE THRUST PROPELLER CONSTRUCTION

Isidor B. Laskowitz, Brooklyn, N. Y.

Application May 17, 1930, Serial No. 453,274

16 Claims. (Cl. 244—25)

The present invention relates to improvements in propellers for air craft and has reference more particularly to a balanced variable thrust propeller construction.

The primary object of the present invention is to provide a structure whereby the direction of thrust of the propeller may be varied in relation to the aircraft upon which the propeller structure is mounted.

A further object is to provide a structure of the above mentioned character for effecting the variance of the thrust of the propeller during the ascension, descension as well as during the actual flight of the aircraft whereby the aircraft will be maintained under control at all times and to further aid in safely maneuvering the plane.

A further and important object is to provide a structure of the above mentioned character which will at all times be positive and efficient in its operation, the control means for varying the direction of thrust being located within easy access of the pilot of the aircraft, the thrust varying mechanism being further of such construction as not to interfere with the ordinary function of the propeller when the same is in operation.

A still further object is to provide a balanced variable thrust propeller construction of the above mentioned character which can be readily and easily installed on an aircraft without necessitating any material alterations, the structure being strong and durable and further well adapted to the purposes for which it is designed.

Other objects and advantages of the invention will become apparent from the following description when taken in connection with the accompanying drawings.

In the accompanying drawings wherein like reference characters indicate corresponding parts throughout the several views.

Figure 1 is an elevational view, a portion of the body of the aircraft being shown in section for more clearly illustrating the manner in which the present invention is associated with the aircraft.

Figure 2 is a longitudinal sectional view taken approximately on the line 2—2 of Figure 1 looking downwardly.

Figure 3 is a vertical sectional view taken approximately on the line 3—3 of Figure 1 looking in the direction of the arrows.

Figure 4 is a sectional view taken on the line 4—4 of Figure 2 looking in the direction of the arrows.

Figure 5 is a similar section taken substantially on the line 5—5 of Figure 2 and looking in the same direction, and Figure 6 is a fragmentary detail of a slight modification showing a single operating means for effecting the rotation of the front and rear propellers.

In the drawings, wherein for the purpose of illustration is shown the preferred embodiment of my invention, the numeral 1 designates generally a portion of the body of an aircraft such as an aeroplane, hydroplane, amphibian or the like, the cockpit or cabin being designated by the numeral 2. Secured on the body of the aircraft and adapted to be disposed longitudinally with respect to the wings, not shown, is a base 3.

Rigidly supported on the end portions of the base 3 are the radial air cooled engines 4 and 5, respectively, and as these engines are of the conventional construction, a detailed description of the same is believed unnecessary for the purposes of the present invention. The driving shaft of the engine 4 is indicated by the reference character 6 while the driving shaft of the opposite engine 5 is denoted by the numeral 7 and these driving shafts are arranged in alinement with each other, the inner opposed ends of the shaft being spaced from each other and extending into the housing 8 through the opposed end walls thereof. This housing 8 forms a part of the propeller carrying unit that is denoted generally by the numeral 9, the construction of the propeller unit 9 being hereinafter more fully described. The two engines and the propeller mechanism are mounted on the top of the wing and are located longitudinally in line with the center of gravity of the aircraft.

Suitable bearings are provided for the driving shafts adjacent the inner opposed sides of the engine casings as indicated at 10 in Figure 2, additional bearings 11 being associated with the end walls of the housing 8 for cooperation with the inner opposed end portions of the driving shaft. A bearing sleeve 12 is secured on the inner end of the driving shaft 7 for rotation therewith and the inner end of the driving shaft 6 is free to rotate in this bearing sleeve 12 as also clearly shown in Figure 2.

Front and rear propeller shafts 13 and 14 respectively, are journaled through suitable bearings in the front and rear sides of the housing 8 and mounted on the outer ends of these propeller shafts are the propellers 15 and 16, respectively. The front propeller shaft 13 is driven by the driving shaft 6 through the medium of the intermeshing bevel gears 17 and 18, respectively. Similar bevel gears 19 and 20 are associated with the inner end portions of the driving and driven shafts 7 and 14, respectively for effecting the rotation of the rear or pusher propeller 16 as is readily obvious from the construction disclosed in Figure 2. Access to the gearing arranged in the housing 8 of the propeller unit 9 may be had through suitable openings provided in the top and bottom of the housing, a cover plate 21 being removably associated with each open side of the housing.

With the arrangement of the gearing as shown in Figure 2, the front or puller propeller 15 rotates in a counterclockwise direction while the rear or pusher propeller 16 will rotate in a clockwise direction. The propellers rotating in opposite directions will prevent any turning movement to the aircraft and thus will clearly aid in effecting the proper control of the aircraft while in flight.

The pull and push of the propellers is transmitted to the housing 8, which in turn is carried to the respective engines through the medium of the elongated cylindrical shells or sleeves 22 and 23, respectively. These shells or sleeves are secured at their inner ends to the respective end walls of the housing 8 and are disposed concentrically around the driving shafts 6 and 7, respectively. The outer end of each shell or sleeve is formed with an outwardly extending flange 24 that cooperates with a ring-like member 25 secured to the outer side wall of the casing of the respective engine, suitable bearings being interposed between the flange 24 and the ring 25, to reduce friction to a minimum. An encircling ring 26 is disposed around the flanged outer end of each cylindrical sleeve or shell and is carried by the respective engine casings as also shown very clearly in Figure 2 of the drawings.

A streamline casing 27 is arranged around each cylindrical sleeve or shell, the outer end of each casing being rigidly secured to the respective encircling ring 26 while the inner end of each streamline casing is formed with an inwardly extending flange and suitable bearings 27ᵃ are interposed between the flanged inner end of each streamline casing and the adjacent portion of the respective cylindrical sleeve or shell. The casings 27 are of a streamline structure for the purpose of reducing the air resistance as much as possible and in Figure 5 of the drawings, there is disclosed a detail of the casing construction.

Forming a salient part of the present invention is the means for turning the cylindrical sleeves and the propeller unit associated therewith to vary the direction of thrust of the propellers and this means includes a worm wheel 28 that is rigidly secured on the outer end portions of each cylindrical sleeve or shell and cooperating with each worm wheel is the worm 29 mounted on the upper end of a vertically disposed shaft 30. Each of the shafts 30 extends downwardly through the base 3 and the lower ends of the shaft 30 are operatively connected to the respective ends of the horizontally disposed shaft 31 through the medium of suitable gearings shown very clearly in Figures 1 and 3 of the drawings, the shaft 31 being supported in suitable brackets suspended from the bottom of the base 3.

The shaft 31 is in turn driven by an angularly disposed shaft 32 through the medium of intermeshing bevel gears designated generally by the numeral 33. The lower forward end of the angularly disposed shaft 32 is in turn operatively connected with a cross shaft 34 also through the medium of bevel gearing indicated at 35, the cross shaft 34 being mounted on a suitable bracket 36 located in the cockpit or pilot's cabin 2. Suitable hand wheels 37 are secured on the outer ends of the cross shaft 34 for operating same from either side as suggested very clearly in Figure 1.

While I have shown a dual system of control, I do not wish to limit myself to this arrangement as a single control structure may be equally as well employed for effecting the rotation of the elongated cylindrical sleeves or shells and the propeller unit mounted thereon to effect the variation of the direction of thrust of the propellers.

The operation of my variable thrust propeller structure is readily obvious from the construction disclosed. The direction of thrust of the propellers can be varied at the will of the pilot with the propellers revolving at their normal or other speed. The propellers may be revolved in a complete circle and consequently the thrust may be either forward, backward, up or down as is desired. Thus the pilot is able to utilize the thrust of the propellers to the best advantage in safely maneuvering the plane while in flight as well as during the periods of taking-off or alighting.

The provision of two engines such as shown in the present instance enables the aircraft to be operated by one engine should the other accidentally become inoperative while the aircraft is in flight.

In Figure 6 of the drawings, I have shown a modification of the invention wherein instead of two independent systems of propellers, the two propellers are geared for rotation by means of a single or common driving shaft which may be driven by one or more engines. In this instance, the driving shaft is designated by the numeral 38 and the same extends through the opposed side walls of the housing 39, the propeller shafts that carry the front and rear propellers 40 and 41, respectively, on their outer ends, carrying bevel gears 42 and 43, respectvely on their inner ends for meshing engagement with the bevel gear 44 secured on the central portion of the driving shaft 38.

By the use of the present invention, the direction of thrust may be made to act upwardly so as to counteract or oppose the force of gravity acting on the aircraft and this arrangement is of great importance as it will prevent the aircraft from descending too rapidly.

The arrangement of the oppositely rotating pusher and puller propellers in the manner as shown and described assures the proper balancing of the rotatable housing so that the force or effect required to rotate the housing is reduced to a minimum.

The simplicity of my construction and arrangement of parts enables the same to be readily and easily installed on an aircraft without necessitating any material alterations and furthermore, the changing of the direction of thrust may be effected without interfering with the ordinary function of the propellers. A structure of the above mentioned character will at all times be positive and efficient in its operation and the control means for operating the same is at all times within easy reach of the pilot.

While I have shown the preferred embodiment of the invention, it is to be understood that minor changes in the size, shape and arrangement of parts may be resorted to without departing from the spirit of the invention and the scope of the appended claims.

Having thus described my invention what I claim is:

1. In combination, a rotatable driving shaft, a housing mounted for rotation on said shaft, a propeller shaft journaled for rotation through one side of the housing, a propeller on the outer end of the shaft, means for operatively connecting the driving shaft with the propeller shaft to effect the rotation of the latter, a sleeve carried by the housing for rotation therewith and encircling the driving shaft, a manually operable shaft located remotely from the aforementioned structure, means for operatively connecting the manually operable shaft with the sleeve for actuating the same and the housing to vary the direction of thrust of the propeller, and a streamline casing surrounding the sleeve and being stationary with respect to the movable sleeve.

2. In an aircraft, the combination with an engine and the driving shaft thereof, a housing mounted for rotation on the drive shaft, a propeller shaft journaled for rotation through one wall of the housing, a propeller on the outer end of the propeller shaft, gearing inner-connecting the drive shaft with the propeller shaft, a sleeve carried by the housing for rotation therewith encircling the drive shaft, means for actuating the sleeve at a remote point for varying the direction of thrust of the propeller, said means including a worm wheel carried by the sleeve, a manually operable shaft, a worm mounted on the last mentioned shaft for cooperation with the worm wheel, and a stationary streamline casing including the worm wheel and worm and surrounding the sleeve.

3. A structure of the class described comprising in combination, a base, a pair of spaced engines mounted on the base, the inner opposed ends of the drive shaft of the engines being disposed in spaced relation, a housing mounted for rotation on the inner end portions of the drive shaft, front and rear propeller shafts journaled for rotation through the front and rear sides of the housing, a propeller on the outer end of each propeller shaft, gearing operatively connecting the drive shaft with the respective propeller shaft, a shell carried by each end wall of the housing and arranged concentrically with respect to the respective drive shaft, and remotely controlled mechanism for rotating the shell and the housing.

4. In an aircraft, the combination with a pair of coacting independently powered rotatable propellers and the operating means therefor, of additional means for varying the direction of thrust of the propellers without interfering with the rotation of the propellers, said propellers being balanced with respect to one another about a common axis, the movement of said propellers for varying the thrust being independent of the movement of the power means that actuates said propellers.

5. In combination, a housing mounted for rotation, on a horizontal axis, a pair of propeller shafts journaled for rotation through the sides of the housing, a propeller on the outer end of each propeller shaft, independent power means for rotating the propeller shaft and additional means for effecting the movement of the housing about its horizontal axis for varying the direction of thrust of the propellers in a complete circle, the movement of said propellers for varying the thrust being independent of the movement of said power means.

6. In combination, a housing mounted for rotation on a horizontal axis, a pair of propeller shafts journaled for rotation through the sides of the housing, a propeller on the outer end of each propeller shaft, independent power means for rotating the propeller shafts, and additional means for effecting the movement of the housing about its horizontal axis for varying the direction of thrust of the propellers in a complete circle, said last mentioned means being controlled from a remote point, and said propellers being balanced with respect to one another about a common axis.

7. In combination, a pair of independently powered rotatable drive shafts, a housing mounted for rotation on said drive shafts, propeller shafts journaled for rotation through sides of the housing, a propeller on the outer end of each propeller shaft, gearing operatively connecting the rotatable driving shafts with the propeller shafts to actuate the latter and means for moving the housing and the propeller structures carried thereby about the driving shafts to vary the direction of thrust of the propellers in a complete circle, said propellers being balanced with respect to one another about a common axis.

8. In combination, a pair of independently powered rotatable drive shafts, a housing mounted for rotation on said drive shafts, a pair of propeller shafts journaled for rotation through sides of the housing, a propeller on the outer end of the propeller shafts, gearing operatively connecting the rotatable driving shafts with the propeller shafts to actuate the latter, and means for moving the housing and the propeller structure carried thereby about the driving shafts to vary the direction of thrust of the propellers in a complete circle, said last mentioned means including a shell carried by the housing and arranged concentrically with respect to the driving shafts, and remotely controlled mechanism for rotating the shell and housing.

9. In combination, a pair of independently powered rotatable driving shafts, a housing mounted for rotation on said shafts, a pair of propeller shafts journaled for rotation through sides of the housing, a propeller on the outer end of the shafts, means for operatively connecting the driving shafts with the propeller shafts to effect the rotation of the latter, sleeves carried by the housing for rotation therewith and encircling the driving shafts, a manually operable shaft located remotely from the aforementioned structure, and means for operatively connecting the manually operable shaft with the sleeves for actuating the same and the housing to vary the direction of thrust of the propellers, said propellers being balanced with respect to one another about a common axis.

10. In an aircraft, the combination with a pair of engines and the independent driving shafts thereof, a housing mounted for rotation on the drive shafts, propeller shafts journaled for rotation through walls of the housing, a propeller on the outer end of the propeller shafts, gearing interconnecting the drive shafts with the propeller shafts, sleeves carried by the housing for rotation therewith encircling the drive shafts, and means for actuating the sleeves at a remote point for varying the direction of thrust of the propellers in a complete circle.

11. In an aircraft, the combination with a pair of engines and the independent driving shafts thereof, a housing mounted for rotation on the drive shafts, propeller shafts journaled for rotation through walls of the housing, a propeller on the outer end of the propeller shafts, gearing interconnecting the drive shafts with the propeller shafts, sleeves carried by the housing for rotation therewith encircling the drive shafts, means for actuating the sleeves at a remote point for varying the direction of thrust of the propellers, said propellers being balanced with respect to one another about a common axis, and said means including a worm wheel carried by a sleeve, a manually operable shaft and a worm mounted on the last mentioned shaft for cooperation with the worm wheel.

12. In an aircraft, the combination with a housing mounted for rotation on a horizontal axis, front and rear propeller shafts journaled for rotation through the front and rear sides of the housing, a propeller on the outer end of each propeller shaft, and independent power means for rotating the propeller shafts, and additional means for rotating the housing about its horizontal axis for varying the direction of thrust of the propellers in a complete circle, the movement of said propellers for varying the thrust being independent of the movement of said power means.

13. In an aircraft, the combination with a housing mounted for rotation on a horizontal axis, front and rear propeller shafts journaled for rotation through the front and rear sides of the housing, a propeller on the outer end of each propeller shaft, and independent power means for rotating the propeller shaft, and additional means for rotating the housing about its horizontal axis for varying direction of thrust of the propellers, said propellers being balanced with respect to one another, about a common axis, the movement of said propellers for varying the thrust being independent of the movement of said power means, and said propeller shafts rotating in opposite directions with respect to each other.

14. In an aircraft, a supporting base secured on the body of the aircraft and disposed longitudinally with respect to the wings, a housing mounted for rotation on a horizontal axis on said base, front and rear propeller shafts journaled for rotation through the front and rear sides of the housing, a propeller on the outer end of each propeller shaft, independent power means mounted on the base for actuating the propeller shafts, and additional means for effecting the movement of the housing about its horizontal axis for varying the direction of thrust of the propellers in a complete circle, the movement of said propellers for varying the thrust being independent of the movement of said power means.

15. In an aircraft, a supporting base secured on the body of the aircraft and disposed longitudinally with respect to the wings, a housing mounted for rotation on a horizontal axis on said base, front and rear propeller shafts journaled for rotation through the front and rear sides of the housing, a propeller on the outer end of each propeller shaft, independent power means mounted on the base for actuating the propeller shafts, and remotely controlled mechanism for rotating the housing to vary the direction of thrust of the propellers, said propellers being balanced with respect to one another about a common axis, the movement of said propellers for varying the thrust being independent of the movement of said power means.

16. A structure of the class described comprising in combination, a base, a pair of spaced engines mounted on the base, the inner opposed ends of the drive shaft of the engines being independently disposed in spaced relation, a housing mounted for rotation on the inner end portions of the drive shafts, front and rear propeller shafts journaled for rotation through the front and rear sides of the housing, a propeller on the outer end of each propeller shaft, gearing operatively connecting the drive shafts with the respective propeller shafts, and remotely controlled means for turning the housing about a horizontal axis to vary the direction of thrust of the propellers in a complete circle.

ISIDOR B. LASKOWITZ.